United States Patent [19]

Steiner

[11] Patent Number: 5,630,942

[45] Date of Patent: May 20, 1997

[54] TWO PHASE ANAEROBIC DIGESTION PROCESS UTILIZING THERMOPHILIC, FIXED GROWTH BACTERIA

[75] Inventor: Charles G. Steiner, Shawnee Mission, Kans.

[73] Assignee: Purification Industries International, Shawnee Mission, Kans.

[21] Appl. No.: 654,534

[22] Filed: May 29, 1996

[51] Int. Cl.$^6$ .............................. C02F 3/06; C02F 3/28
[52] U.S. Cl. .................... 210/603; 210/612; 210/615
[58] Field of Search .................... 210/603, 612–617, 210/630, 631

[56] References Cited

U.S. PATENT DOCUMENTS

| | | | |
|---|---|---|---|
| 4,022,665 | 5/1977 | Ghosh et al. | 195/27 |
| 4,318,993 | 3/1982 | Ghosh et al. | 210/631 |
| 4,551,250 | 11/1985 | Morper et al. | 210/603 |
| 4,597,872 | 7/1986 | Andersson et al. | 210/603 |
| 4,659,471 | 4/1987 | Molin et al. | 210/603 |
| 4,663,043 | 5/1987 | Molin et al. | 210/603 |
| 4,664,795 | 5/1987 | Stegall et al. | 210/202 |
| 4,834,879 | 5/1989 | Stegall et al. | 210/205 |
| 4,849,108 | 7/1989 | de Wilde et al. | 210/603 |
| 4,999,103 | 3/1991 | Bogart | 210/151 |
| 5,514,277 | 5/1996 | Khudenko | 210/603 |
| 5,525,228 | 6/1996 | Dague et al. | 210/603 |

OTHER PUBLICATIONS

News Release; IGT & Convergent Biomass Technologies Sign License & Technology Development Agreement.
Design Manual; PURISEP Separators; Purification International, Inc.; Feb. 1989.
Research paper; Sambhunath Ghosh et al; Application of Packed–Bed Upflow Towers in Two–Phase Anaerobic Digestion; Institute of Gas Technology Apr. 20–23, 1982.
Vipul J. Srivastava et al; Biogasification of Community–Derived Biomass and Solid Wastes in a Pilot–Scale SOLCON Reactor; *Applied Biochemistry and Biotechnology*; vol. 20/21, 1989.

Research paper; Sambhunath Ghosh; Two–Phase Anaerobic Digestion of Organic Wastes; Institute of Gas Technology; Oct. 19–20, 1981.

Vipul J. Srivastava et al; Improved Efficiency and Stable Digestion of Biomass in Nonmixed Upflow Solids Reactors; *The Human Press Inc.*; 1988.

Sales literature of Davy McKee Corporation, Houston, Texas for Anaerobic Filter System, exact publication date unknown, but at least one year prior to the filing of the present application.

Donald L. Klass, Energy From Biomass and Wastes X; *Elsevier Applied Sciences Publishers London*; Institute of Gas Technology Chicago.

Sales literature of EIMCO Process Equipment Company of Salt Lake City, Utah, for EIMCO Digestion Equipment, Cost–Effective Sludge Stabilization, exact publication date unknown, but at least one year prior to the filing of the present application.

(List continued on next page.)

*Primary Examiner*—Thomas G. Wyse
*Attorney, Agent, or Firm*—Litman, McMahon and Brown, L.L.C.

[57] ABSTRACT

An improved anaerobic waste water treatment process comprising the steps of introducing waste water containing organic material into a first reaction zone containing thermophilic, fixed growth, hydrolytic and acidogenic bacteria and fermenting the waste water in the first reaction zone under anaerobic conditions at a pH of between about 5 and 6 and a temperature between about 115 to 160 degrees Fahrenheit to produce an acid effluent. The acid effluent is then conveyed to a second reaction zone containing thermophilic, fixed growth, methanogenic bacteria where it is fermented under anaerobic conditions at a pH between about 7.2 and 8.2 and at a temperature between about 115 to 160 degrees Fahrenheit to produce process effluent and gas including methane. The methane is collected and the process effluent is removed.

12 Claims, 2 Drawing Sheets

OTHER PUBLICATIONS

Sales literature of Biothane Anaerobic Wastewater Treatment Process of Waukesha, Wisconsin for Proven Technology For A Cleaner Environment, exact publication date unknown, but at least one year prior to the filing of the present application.

Sales literature of Enviro Systems Supply, Inc., of Hollywood, Florida for Star Anaerobic Industrial Pretreatment, exact publication date unknown, but at least one year prior to the filing of the present application.

Sales literature of CBI Walker, Inc., of Aurora, Illinois for Anaerobic Wastewater Treatment, exact publication date unknown, but at least one year prior to the filing of the present application.

Sales literature of PDM Pitt–Des Moines, Inc. of Pittsburgh, Pennsylvania for Intensified Anaerobic Digesters, exact publication date unknown, but at least one year prior to the filing of the present application.

Sales literature of PFT for Anaerobic Digestion Equipment, exact publication date unknown, but at least one year prior to the filing of the present application.

Sales literature of ADI Systems Inc. of Fredericton, NB Canada for ADI Anaerobic Systems, exact publication date unknown, but at least one year prior to the filing of the present application.

C.G. Steiner; Take a New Look at the RBS Process; *Water & Wastes Engineering*; May 1979 vol. 16 No. 5.

TWO PHASE ANAEROBIC DIGESTION PROCESS UTILIZING THERMOPHILIC, FIXED GROWTH BACTERIA

BACKGROUND OF THE INVENTION

The present invention relates to an improved anaerobic waste water treatment process to more efficiently treat waste water.

In conventional anaerobic treatment processes, waste water, containing organic matter, is treated in a single vessel or anaerobic region utilizing suspended growth bacteria. However, the anaerobic digestion of organic matter involves two independent biological fermentation or digestion steps or phases. In the first phase hydrolytic and acidogenic bacteria convert dispersed and dissolved organics into intermediates comprising aldehydes, alcohols, acids, and carbon dioxide. In the second phase, methanogenic bacteria convert the intermediates from the first phase into methane and carbon dioxide. Sulfur compounds, if present, are reduced to hydrogen sulfide gas.

Processes utilizing separate reactors or reaction zones for each phase have been developed to permit independent and more efficient control of the operating parameters of the separate phases. However, existing processes fail to utilize the full potential of the anaerobic treatment process.

SUMMARY OF THE INVENTION

The present invention is an improved method of anaerobic treatment of waste water. The waste water, containing organic material, is introduced into a first reaction zone containing thermophilic, fixed growth, hydrolytic and acidogenic bacteria. The waste water is fermented in the first reaction zone under anaerobic conditions at a pH in the range between about 5 and 6 and a temperature in the range between about 115 to 160 degrees Fahrenheit to produce an acid effluent. The acid effluent is conveyed to a second reaction zone containing thermophilic, fixed growth, methanogenic bacteria where it is fermented under anaerobic conditions at a pH between about 7.2 and 8.2 and a temperature between about 115 to 160 degrees Fahrenheit to produce process effluent and gas including methane. The gas which includes methane is then collected and the process effluent is removed.

The first reaction zone is preferably within a first reactor vessel having structure for supporting fixed growth bacteria. The structure preferably comprises spaced sheets of corrugated material each having troughs and peaks and secured within the vessel such that the troughs and peaks are angled upward. The second reaction zone is also preferably within a second reactor vessel utilizing spaced sheets of corrugated material for supporting fixed growth bacteria as in the first reactor vessel. The corrugated material provide excellent hydraulic mixing as well as efficient solids/liquids/gas separation within each of the reactor vessels.

Objects and Advantages of the Invention

Therefore, it is an object of this invention to provide an improved anaerobic waste water treatment process in which the waste water is treated in two independent biological steps or phases comprising an acid phase and a methane phase; to provide such a system which efficiently produces methane; to provide such a system in which the acid phase and the methane phase occur in separate reaction zones; to provide such a system in which the acid phase occurs in a first reaction zone and the methane phase occurs in a second reaction zone; to provide such a system which utilizes thermophilic, fixed growth, acidogenic bacteria in the first reaction zone and thermophilic, fixed growth, methanogenic bacteria in the second reaction zone; to provide such a system wherein the reaction zones comprise separate reactor vessels having sheets of corrugated material secured therein to provide structure for supporting the fixed growth bacteria and providing efficient solids/liquids/gas separation within each reactor vessel.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
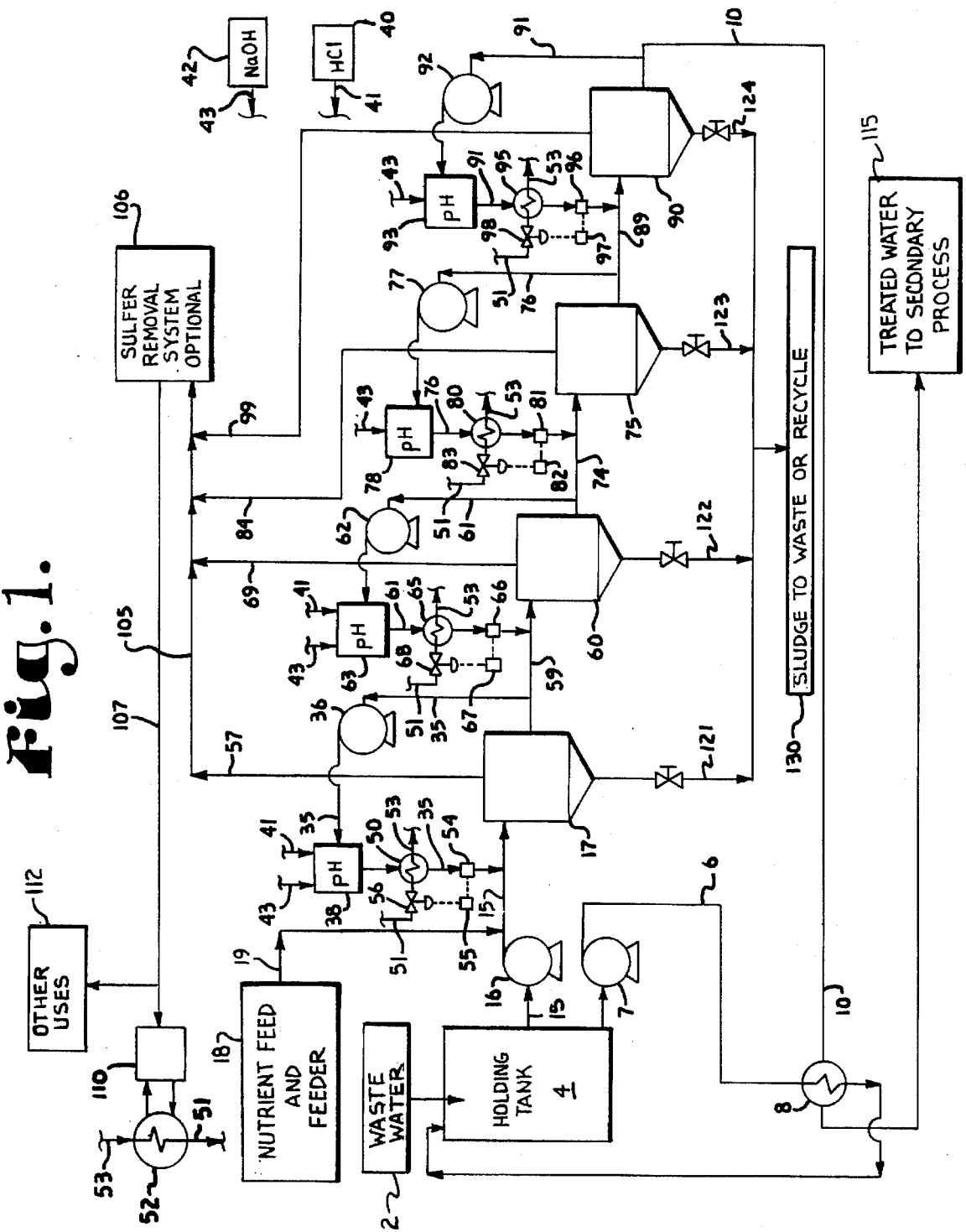
FIG. 1 is a process flow diagram of the anaerobic treatment process of the present invention.

Referring to the drawings in more detail, FIG. 1 is a process flow diagram of a preferred embodiment of the anaerobic waste water treatment process of the present invention. The process is adapted to treat waste water from source generally identified by the reference numeral 1 which may be any waste water solution or the like having organic and/or other contaminants suitable for being acted upon by microorganisms to reduce the amount of organic contamination, especially elements creating an oxygen demand therein. The waste water from the source 1 may be from a wide variety of sources including: breweries and distilleries; chemical plants; dairy/cheese production; ethanol plants; food processing plants; fruit and vegetable canning plants; grain processing plants; meat, fish and poultry plants; municipal sanitary waste water; and pulp and paper facilities and sugar factories. The process can also digest added biological waste such as animal manure, agricultural wastes and soluble solid wastes, especially cellulose containing waste (i.e. cardboard, paper, and cartons) added to the influent stream in slurry form.

An influent stream of waste water is introduced from source 1 via conduit 2 into a covered holding tank 4. A portion of the contents of the holding tank 4 is circulated along recirculation conduit 6 by recirculation pump 7 through heat exchanger 8 and back to the holding tank 4. A process effluent stream is also directed through the heat exchanger 8 via conduit 10 to preheat the influent in the recirculation conduit 6 and, therefore, the influent in the holding tank 4.

The influent is transferred from the holding tank 4 along first transfer conduit 15 by transfer pump 16 to a first reactor vessel 17. Process nutrients are delivered to the influent in the first transfer conduit 15 from a nutrient storage vessel 18 flow connected through nutrient feed conduit 19. The nutrient feed conduit 19 intersects the first transfer conduit 15 downstream of the transfer pump 16 such that nutrient enriched waste water 20 is introduced into the reactor vessel 17.

The process nutrients are added to provide the nutrients which are necessary to sustain the process bacteria, but which are not present in the waste water influent in preferred quantities. The preferred nutrient balance of carbon:nitrogen: phosphorous:sulfur to be attained is 100:6.6:1.0:0.7; however, a wide range of various nutrients can be utilized in accordance with the invention and some wastes may require other nutrients or have different preferred ratios. Minor nutrients which are preferably present in the influent include, iron, cobalt, nickel, calcium, magnesium, selenium, molybdenum, vitamin $B_{12}$, nutrient sulfates, nutrient phosphates and biologically available ammonium and nitrogen.

Figure 2:
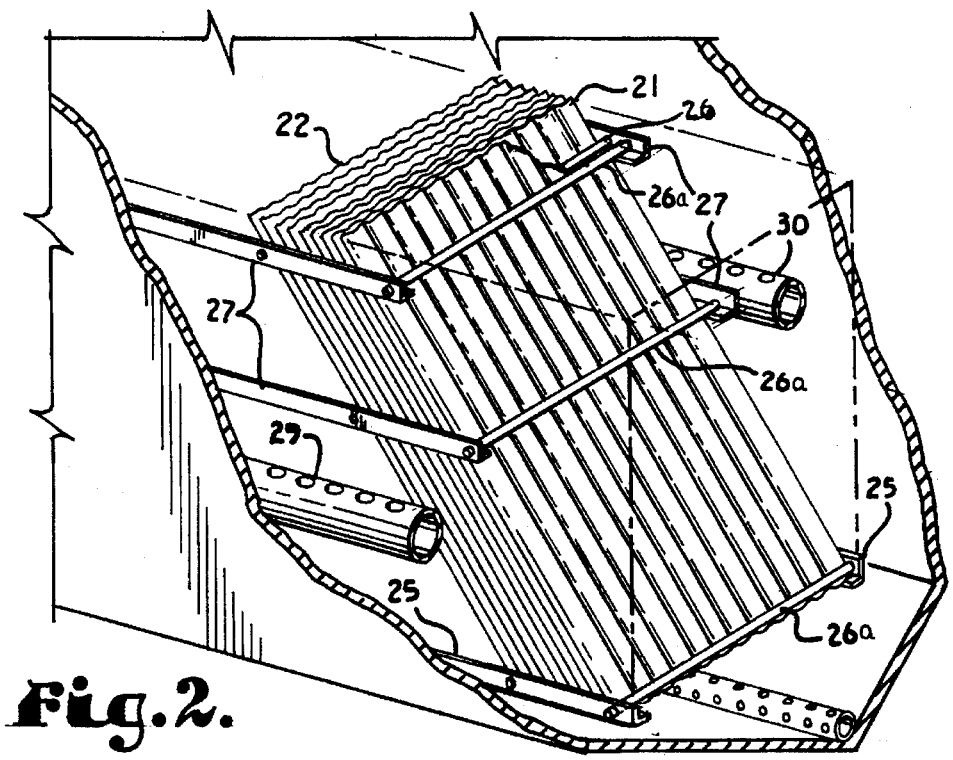
FIG. 2 is a fragmentary perspective view of a reactor vessel utilized in the anaerobic treatment process of the present invention and incorporating an inclined corrugated plate flocculator and separator.
Figure 3:
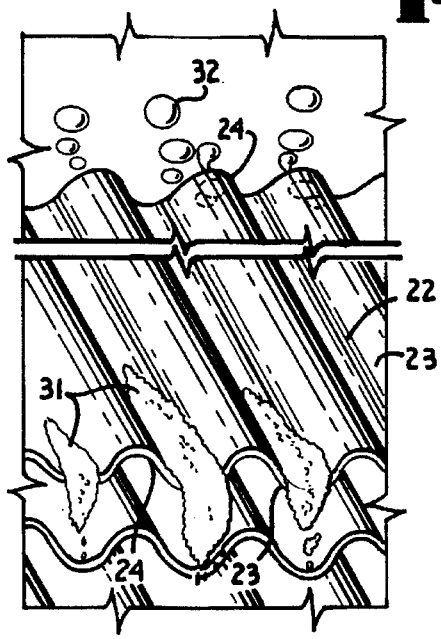
FIG. 3 is an enlarged and fragmentary perspective view of the inclined corrugated plate flocculator and separator as shown in FIG. 2.

An inclined corrugated plate flocculator and separator 21, such as a corrugated plate separator sold by Purification International, Inc., is secured within the first reactor vessel 17. The inclined corrugated plate flocculator and separator 21, as shown in FIGS. 2 and 3 comprises a plurality of corrugated plates 22 each comprising a plurality of troughs 23 and peaks 24 which provide for efficient solids/liquids/ gas separation and provide a considerable amount of surface area for supporting fixed growth bacteria. The corrugated plates 22 are secured or stacked in spaced apart relation generally one above another and inclined at an angle in the range of approximately between 45 degrees and 70 degrees.

The corrugated plates 22 are supported along the bottom by angle supports 25 extending on opposite sides of the reactor vessel 17. A spacer rod 26 extends between each plate 22 and is supported on opposite ends by the angle supports 25. Most of the spacer rods 26 are made from fiberglass reinforced plastic however a selected number of rods (i.e. every tenth rod) are made from stainless steel and include threaded ends such that these rods 26a may be bolted to the angle supports 25 instead of simply resting thereon.

Additional pairs of angle supports 27 extend horizontally along opposite sides of the plates 22 medially thereof and toward an upper end thereof. The angle supports 27 support the ends of spacer rods 26 extending between each plate 22 such that preferably at least three spacer rods 26 separate adjacent plates 22. Additional angles (not shown) extend vertically along opposite sides of the plates 22 at least toward opposite ends of the separator 21. The vertically extending angles engage opposite ends of spacer rods 26 extending between plates 22 along the ends of the separator 21.

The angle supports 25 and 27 along with additional angle supports not shown form a part of a free standing frame 28 for supporting the plates 22 within the reactor vessel 17.

Figure 4:
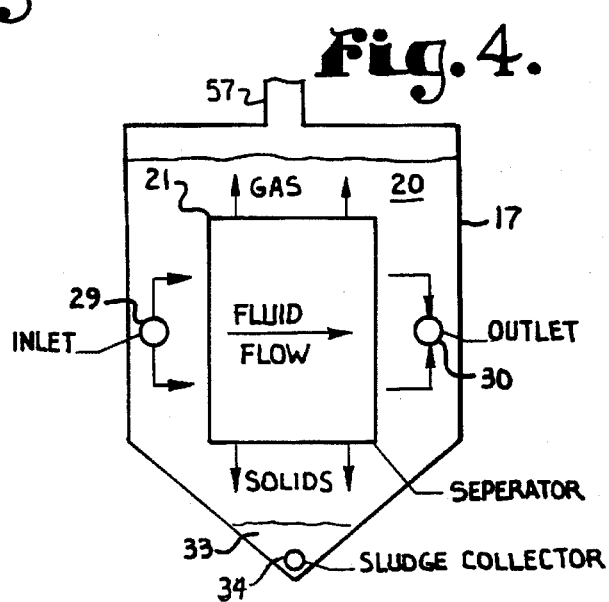
FIG. 4 is a schematic view of the reactor vessel as shown in FIG. 2.

As shown schematically in FIG. 4, waste water 1 is discharged into the reactor vessel 17 through one or more influent pipes or orificed distributors 29 extending along one side of the inclined corrugated plate flocculator and separator 21. One or more effluent pipes or orificed collectors 30 extend along an opposite side of the separator 21 to create a cross flow of waste water 1 across the plates 22 from the influent pipe 29 to the effluent pipe 30. Although the reactor vessel 17 shown generally is a rectangular vessel with a hopper bottom, it is to be understood that the shape of the vessel is not controlling and it is foreseen that reactor vessels of wide ranging shapes and sizes could be utilized in accordance with the invention.

An existing population of thermophilic, fixed growth, hydrolytic and acidogenic bacteria is maintained in the first reactor vessel 17, which bacteria may be free floating or on the bottom of the vessel 17, but are generally supported on the corrugated plates 22. During the time that waste water 20 is retained in the reactor vessel 17 and especially as it passes across the plates 22, the waste in the waste water 20 is generally allowed to ferment therein under anaerobic conditions at a pH between about 5 and 6 and under thermophilic conditions, generally between 115 to 160 degrees Fahrenheit, preferably between about 133 and 143 degrees Fahrenheit and most preferably at a temperature of approximately 138 degrees Fahrenheit. The hydrolytic and acidogenic bacteria in the first reactor vessel 17 convert dispersed and dissolved organics in the waste water 1 into aldehydes, alcohols, acids, and carbon dioxide. The resultant liquid product is generally referred to as an acid effluent or a first stage acid effluent.

As bacteria and other solids particles 31 separate out of the waste water 20 above the corrugated plates 22, the particles 31 slide into the troughs 23 and coalesce with other particles 31. As the particles 31 migrate down the inclined troughs 23, the particles 31 agglomerate with other particles 31 due to different migration rates of the particles 31. Similarly gas bubbles 32 separating out of the waste water 20 during fermentation rise and engage the underside of the corrugated plates 22 and collect in the peaks 24 whereat smaller bubbles coalesce with other gas bubbles 32. As the gas bubbles 32 migrate up the inclined peaks 24, the gas bubbles 32 agglomerate with other gas bubbles 32 due to different migration rates of the bubbles 32.

Some of the solids particles 31, which coalesce and agglomerate, slide off of the corrugated plates 22 and form a layer of sludge 33 on the bottom of the reactor vessel 17. The sludge 33, substantially bacterial biomass, is periodically wasted or recycled through a sludge collection conduit 34.

A portion of the contents of the first reactor vessel 17 are continuously recirculated through recirculation conduit 35 by recirculation pump 36. A pH control system 38, which generally comprises a pH sensor, a pH controller, an acid feeder and a caustic feeder (not shown) is connected to the recirculation conduit 35 and is used to maintain the pH of the contents of the recirculation conduit 35 and, therefore, the contents of the first reactor vessel 17 at a pH in the range of between 5.0 and 6.0. The pH is maintained at the desired level through the controlled addition of acid or caustic. The acid, preferably hydrochloric acid, is supplied from an acid feed tank 40 through a branch of an acid feed line 41. The caustic, preferably sodium hydroxide, is supplied from a caustic feed tank 42 through a branch of a caustic feed line 43. Acid feed line 41 and caustic feed line 43 and their respective branches are shown incompletely so as to remove excess clutter from the drawings.

The recirculation conduit 35 also passes through a heat exchanger 50 where fluid therein is heated by heat exchange with a liquid in a branch of a hot liquid feed conduit 51 originating from a liquid heating vessel 52. After passing through the heat exchanger 50 the cooled liquid from conduit 51 is returned to the liquid heating vessel 52 by a branch of a cold liquid return conduit 53. The hot liquid feed conduit 51 and the cold liquid return conduit 53 and their respective branches are shown in fragmentary lines in FIG. 1 to reduce clutter.

A temperature sensor 54 extending into the recirculation conduit 35 downstream of the heat exchanger 50 communicates with a temperature controller 55 which communicates with a valve 56 on the branch of the hot liquid feed conduit 51 entering the heat exchanger 50 to regulate the flow of hot liquid to the heat exchanger 50 and thereby regulate the temperature of the contents of the recirculation conduit 35 exiting the heat exchanger 50. The temperature controller 55 is set such that the temperature of the contents of the recirculation conduit 35 exiting the heat exchanger 50 is generally heated in the range between 115 to 160 degrees Fahrenheit, preferably between 130 to 145 degrees Fahrenheit and most preferably to 138 degrees Fahrenheit. The recirculation conduit 35 then intersects the transfer conduit 15 such that the contents of the recirculation conduit 35 are directed back into the first reactor vessel 17 such that the contents of the first reactor vessel 17 are generally maintained at the temperature set by the temperature controller 55.

Gas produced from the fermentation process in the first reactor vessel 17, principally carbon dioxide, is directed out of the first reactor vessel 17 through vent line 57.

A portion of the contents of the recirculation conduit 35 exiting the first reactor vessel 17 is drawn off and allowed to flow by gravity along a second transfer conduit 59 to a second reactor vessel 60. The second reactor vessel 60 is of similar design as the first reactor vessel 17, and incorporates an inclined corrugated plate flocculator and separator (not shown) of the same design as the flocculator and separator 21 in the first reactor vessel 17.

An existing population of thermophilic, fixed growth, hydrolytic and acidogenic bacteria is maintained in the second reactor vessel 60. The contents of the second reactor vessel 60 (comprising the first stage acid effluent), are allowed to ferment therein under anaerobic conditions at a pH in the range between about 5 and 6 and under thermophilic conditions, generally in the range between 115 to 160 degrees Fahrenheit, preferably between about 133 and 143 degrees Fahrenheit and most preferably at a temperature of approximately 138 degrees Fahrenheit. The hydrolytic and acidogenic bacteria in the second reactor vessel 60 continue the process of converting dispersed and dissolved organics in the first stage acid effluent into aldehydes, alcohols, acids, and carbon dioxide. The resultant product is generally referred to as a second stage acid effluent.

A portion of the contents of the second reactor vessel 60 are continuously recirculated along recirculation conduit 61 by recirculation pump 62. A pH control system 63, similar in operation to the pH control system 38, is connected to the recirculation conduit 61 and used to maintain the pH of the contents of the recirculation conduit 61 and, therefore, the contents of the second reactor vessel 60 at a pH in the range of between 5.0 and 6.0. The pH is maintained at the desired level through the controlled addition of acid or caustic through a branch of acid feed line 41 and a branch of a caustic feed line 43 respectively.

The recirculation conduit 60 also passes through a heat exchanger 65 where fluid therein is heated by heated liquid from a branch of the hot liquid feed conduit 51. After passing through the heat exchanger 65, the cooled liquid from the hot liquid feed conduit 51 is returned to the liquid heating vessel 52 by a branch of the cold liquid return conduit 53. A temperature sensor 66, a temperature controller 67 and a valve 68 are used in a similar fashion as the temperature sensor 54, temperature controller 55 and valve 56 to regulate the temperature of the contents of the recirculation conduit 61 exiting the heat exchanger 65. The temperature controller 67 is set such that the temperature of the contents of the recirculation conduit 61 exiting the heat exchanger 65 is generally heated in the range between 115 to 160 degrees Fahrenheit, preferably between 130 to 145 degrees Fahrenheit and most preferably to 136 degrees Fahrenheit. The recirculation conduit 61 then flow intersects with the second transfer conduit 59 such that the contents of the recirculation conduit 61 are directed back into the second reactor vessel 60 and such that the contents of the second reactor vessel 60 are generally maintained at the temperature of the contents of the recirculation conduit 61 exiting the heat exchanger 65.

Gas produced from the fermentation process in the second reactor vessel 60, generally comprising carbon dioxide, methane and nitrogen, is directed out of the second reactor vessel 60 through vent line 69.

A portion of the contents of the recirculation conduit 61 is drawn off and allowed to flow by gravity along a third transfer conduit 74 to a third reactor vessel 75. The third reactor vessel 75 is of similar design as the first reactor vessel 17 and also incorporates an inclined corrugated plate flocculator and separator (not shown) of the same design as the flocculator and separator 21 in the first reactor vessel 17.

An existing population of thermophilic, fixed growth, methanogenic bacteria is maintained in the third reactor vessel 75. The contents of the third reactor vessel 75 (comprising the second stage acid effluent), are allowed to ferment therein under anaerobic conditions at a pH in the range between about 7.2 and 8.2 and under thermophilic conditions, generally in the range between 115 to 160 degrees Fahrenheit, preferably between about 133 and 143 degrees Fahrenheit and most preferably at a temperature of approximately 138 degrees Fahrenheit. The methanogenic bacteria in the third reactor vessel generally convert the aldehydes, alcohols and acids from the second stage acid effluent into methane and carbon dioxide. Any sulfur compounds, if present, are reduced to hydrogen sulfide gas. Nitrogen is also produced from the fermentation process.

A portion of the contents of the third reactor vessel 75 are continuously recirculated along recirculation conduit 76 by recirculation pump 77. A pH control system 78, similar in operation to the pH control system 38, but without an acid feeder, is connected to the recirculation conduit 76 and used to maintain the pH of the contents of the recirculation conduit 76 and, therefore, the contents of the third reactor vessel 75 at a pH between about 7.2 and 8.2. The pH is maintained in the desired range through the controlled addition of caustic through a branch of the caustic feed line 43.

The recirculation conduit 76 also passes through a heat exchanger 80 where fluid therein is heated by heated liquid from a branch of the hot liquid feed conduit 51. After passing through the heat exchanger 80, the cooled liquid from the hot liquid feed conduit 51 is returned to the liquid heating vessel 52 by a branch of the cold liquid return conduit 53. A temperature sensor 81, a temperature controller 82 and a valve 83 are used in a similar fashion as the temperature sensor 54, temperature controller 55 and valve 56 to regulate the temperature of the contents of the recirculation conduit 76 exiting the heat exchanger 80. The temperature controller 82 is set such that the temperature of the contents of the recirculation conduit 76 exiting the heat exchanger 80 is generally heated so as to be in the range between 115 to 160 degrees Fahrenheit, preferably between 130 to 145 degrees Fahrenheit and most preferably to 138 degrees Fahrenheit. The recirculation conduit 76 then flow intersects with the third transfer conduit 74 such that the contents of the recirculation conduit 76 are directed back into the third reactor vessel 75 and such that the contents of the third reactor vessel 75 are generally maintained at the temperature of the contents of the recirculation conduit 76 exiting the heat exchanger 80.

Gas produced from the fermentation process in the third reactor vessel 75, generally comprising methane, carbon dioxide, hydrogen sulfide and nitrogen, is directed out of the third reactor vessel 75 through vent line 84.

A portion of the contents of the recirculation conduit 76 is drawn off and allowed to flow by gravity along a fourth transfer conduit 89 to a fourth reactor vessel 90. The fourth reactor vessel 90 is of similar design as the first reactor vessel 17 and also incorporates an inclined corrugated plate flocculator and separator (not shown) of the same design as the flocculator and separator 21 in the first reactor vessel 17.

An existing population of thermophilic, fixed growth, methanogenic bacteria is maintained in the fourth reactor vessel 90. The contents of the fourth reactor vessel 90 are allowed to ferment therein under anaerobic conditions at a pH in the range between about 7.2 and 8.2 and under thermophilic conditions, generally in the range between 115 to 160 degrees Fahrenheit, preferably between about 133 and 143 degrees Fahrenheit and most preferably at a temperature of approximately 138 degrees Fahrenheit. The methanogenic bacteria in the fourth reactor vessel generally convert any of the remaining aldehydes, alcohols and acids into methane and carbon dioxide. The remaining effluent may be referred to as second stage process effluent. Any sulfur compounds, if present, are normally reduced to hydrogen sulfide gas. Nitrogen may also be produced during the fermentation process.

A portion of the contents of the fourth reactor vessel 90 is continuously recirculated along recirculation conduit 91 by recirculation pump 92. A pH control system 93, similar in operation to the pH control system 78, is connected to the recirculation conduit 91 and used to maintain the pH of the contents of the recirculation conduit 91 and, therefore, the contents of the fourth reactor vessel 90 at a pH in the range between about 7.2 and 8.2. The pH is maintained at the desired level through the controlled addition of caustic from a branch of the caustic feed line 43.

The recirculation conduit 90 also passes through a heat exchanger 95 where fluid therein is heated by heat exchange with liquid in a branch of the hot liquid feed conduit 51. After passing through the heat exchanger 95, the cooled liquid from the hot liquid feed conduit 51 is returned to the liquid heating vessel 52 by a branch of the cold liquid return conduit 53. A temperature sensor 96, a temperature controller 97 and a valve 98 are used in a similar fashion as the temperature sensor 54, temperature controller 55 and valve 56 to regulate the temperature of the contents of the recirculation conduit 91 exiting the heat exchanger 95. The temperature controller 97 is set such that the temperature of the contents of the recirculation conduit 91 exiting the heat exchanger 95 is generally heated so as to be within the range between 115 to 160 degrees Fahrenheit, preferably between 130 to 145 degrees Fahrenheit and most preferably to 138 degrees Fahrenheit. Fluid in the recirculation conduit 91 then flow intersects with the fourth transfer conduit 89 such that the contents of the recirculation conduit 91 are directed back into the fourth reactor vessel 90 and such that the contents of the fourth reactor vessel 90 are generally maintained at the temperature of the contents of the recirculation conduit 91 exiting the heat exchanger 95.

Gas produced from the fermentation process in the fourth reactor vessel 90, generally comprising methane, carbon dioxide, hydrogen sulfide and nitrogen, is directed out of the fourth reactor vessel 90 through vent line 99. Vent lines 99, 84, 69 and 57 merge into gas transfer line 105 such that gas produced from the fermentation process is generally collected therein. The gas in the gas transfer line 105, principally methane, is passed through a catalytic sulfur removal system 106 to remove sulfur containing compounds therefrom when so desired. At least a portion of the gas generated is directed via a gas transfer line 107 to a gas engine generator 110 where it is burned to produce electricity or other energy output. Additional energy is reclaimed from the cooling water of the generator 110 and from the exhaust gas thereof. Energy reclaimed from the cooling water of the generator 110 and the exhaust gas is used to heat the liquid in the liquid heating vessel 52. It is foreseen that the gas generated could also be used to power gas blowers, gas pumps, or boilers. Excess gas may be stored or distributed for other purposes as represented by box 112.

A portion of the second stage process effluent leaving the fourth reactor vessel 90 is directed out the process effluent conduit 10 and directed through heat exchanger 8 to preheat the influent and cool the process effluent. The process effluent in the process effluent conduit 10 may then be directed through the process effluent conduit 10 to a secondary treatment process such as an aerobic treatment process or to other appropriate disposal means as represented by box 115.

Sludge 33 collected by the sludge collection conduits in each of the reactor vessels 17, 60, 75 and 90 is removed from the vessels via sludge transfer conduits 121, 122, 123 and 124 respectively and transferred to storage to be wasted or treated as represented by box 130.

The process may be more generally described as follows. Nutrient enriched waste water 20 is introduced into the first reaction vessel 17 containing thermophilic, fixed growth, hydrolytic and acidogenic bacteria which are generally supported on the corrugated plates 22 of the separator 21. As the waste water 20 passes across the plates 22 the bacteria therein acts upon or digests dissolved organics in the waste water 20 under anaerobic conditions, at a pH in the range between about 5 and 6, and a temperature in the range between about 115 to 160 degrees Fahrenheit. The hydrolytic and acidogenic bacteria convert a portion of the dispersed and dissolved organics in the waste water 20 in the first reaction vessel 17 into aldehydes, alcohols, acids, and carbon dioxide.

The first effluent from the first reactor vessel is conveyed to the second reactor vessel 60 containing thermophilic, fixed growth, hydrolytic and acidogenic bacteria which are generally supported on the corrugated plates of the separator therein. As the first effluent passes across the corrugated plates the bacteria therein acts upon digests the remaining organic material in the first effluent under anaerobic conditions, at a pH in the range between about 5 and 6, and a temperature in the range between about 115 to 160 degrees Fahrenheit. The hydrolytic and acidogenic bacteria convert a substantial portion of the remaining dispersed and dissolved organics in the first effluent in the second reaction vessel 20 into aldehydes, alcohols, acids, and carbon dioxide.

The second effluent from the second reactor vessel 60 is conveyed to a third reactor vessel 75 containing thermophilic, fixed growth, methanogenic bacteria which are supported on the corrugated plates of the separator therein. As the second effluent passes across the corrugated plates the bacteria therein converts a portion of the aldehydes, alcohols and acids in the second effluent into methane and carbon dioxide. The fermentation process occurs under anaerobic conditions at a pH between about 7.2 and 8.2 and a temperature between about 115 to 160 degrees Fahrenheit. The gas which includes methane is then collected and the process effluent is removed.

The third effluent from the third reactor vessel 60 is conveyed to a fourth reactor vessel 90 containing thermophilic, fixed growth, methanogenic bacteria which are supported on the corrugated plates of the separator therein. As the second effluent passes across the corrugated plates the bacteria therein converts a substantial portion of the remaining aldehydes, alcohols and acids in the second third effluent into methane and carbon dioxide. The fermentation process occurs under anaerobic conditions at a pH between about 7.2 and 8.2 and a temperature between about 115 to 160 degrees Fahrenheit. The gas which includes methane is then collected and the process effluent is removed.

The area or space defined by the first and second reactor vessels 17 and 60 is generally referred to as a first phase or first reaction zone. The first and second reactor vessels 17 and 60 may also be referred to as a first set of reactor vessels or a set of acid phase reactor vessels. The area or space defined by the third and fourth reactor vessels 75 and 90 is generally referred to as a second phase or second reaction zone. The third and fourth reactor vessels 75 and 90 may also be referred to as a second set of reactor vessels or a set of methane phase reactor vessels. Although the first and second sets of reactor vessels are shown as comprising two reactor vessels apiece, it is foreseen that any number of reactor vessel per set, including one per set, may by utilized and the number of reactors in the set of acid phase reactors does not have to correspond to the number of methane phase reactors in the set.

The first reaction zone is preferably within a first reactor vessel having structure for supporting fixed growth bacteria. The structure preferably comprises spaced sheets of corrugated material each having troughs and peaks and secured within the vessel such that the troughs and peaks are angled upward. The second reaction zone is also preferably within a second reactor vessel utilizing spaced sheets of corrugated material for supporting fixed growth bacterial as in the first reactor vessel. The corrugated material provide excellent hydraulic mixing as well as efficient solids/liquids/gas separation within each of the reactor vessels.

Although the first and second reaction zones as described and shown generally comprise reactor vessels, it is foreseen that the first and second reaction zones could be defined by other structure including the area defined by a conduit or pipe.

Although the preferred support structure comprises the corrugated plates 22 described and shown, it is foreseen that other support structure could be utilized including flat plates stacked in closely spaced relationship and inclined upward, and other support structure well known in the art.

The methane generated from the process of the present invention can be concentrated to pipeline quality and compares closely with natural gas in Btu value. A conventional activated sludge aerobic treatment plant will consume about 8,123 kJ/kg COD (3,500 Btu/lb COD) removed whereas the process of the present invention generates about 8,123 kJ/kg COD (3,500 Btu/lb COD) removed.

It is to be understood that while certain forms of the present invention have been illustrated and described herein, it is not to be limited to the specific forms or arrangement of parts described and shown.

What is claimed and desired to be secured by Letters Patent is as follows:

1. An anaerobic waste water treatment process comprising the steps of:
   a. introducing waste water containing organic material into a first reaction zone containing thermophilic, fixed growth, and acidogenic bacteria;
   b. fermenting the waste water in said first reaction zone under anaerobic conditions at a pH in a range between about 5 and 6 and a temperature in a range between about 115 to 160 degrees Fahrenheit to produce an acid effluent;
   c. conveying said acid effluent to a second reaction zone containing thermophilic, fixed growth, methanogenic bacteria;
   d. fermenting the acid effluent in said second reaction zone under anaerobic conditions at a pH in a range between about 7.2 and 8.2 and at a temperature in a range between about 115 to 160 degrees Fahrenheit to produce process effluent and gas including methane;
   e. collecting at least a portion of said gas including methane; and
   f. removing the process effluent.

2. The process as in claim 1 wherein:
   a. said step of fermenting the waste water in said first reaction zone comprises fermenting the waste water in said first reaction zone at a temperature in a range between about 133 to 143 degrees Fahrenheit; and
   b. said step of fermenting the acid effluent in said second reaction zone comprises fermenting the acid effluent in said second reaction zone at a temperature in a range between about 133 to 143 degrees Fahrenheit.

3. The process as in claim 1 wherein:
   a. said step of fermenting the waste water in said first reaction zone comprises fermenting the waste water in said first reaction zone at a temperature of about 138 degrees Fahrenheit; and
   b. said step of fermenting the acid effluent in said second reaction zone comprises fermenting the acid effluent in said second reaction zone at a temperature of about 138 degrees Fahrenheit.

4. The process as in claim 1 wherein:
   a. said steps of introducing the waste water into said first reaction zone and fermenting the waste water therein comprises introducing the waste water into a first reactor vessel containing thermophilic, fixed growth, acidogenic bacteria and fermenting the waste water in said first reactor vessel under anaerobic conditions at a pH in a range of between about 5 and 6 and a temperature in a range of between about 115 to 160 degrees Fahrenheit to produce said acid effluent; and
   b. said steps of conveying the acid effluent to said second reaction zone and fermenting the waste water therein comprises conveying said acid effluent to a second reactor vessel containing thermophilic, fixed growth, acidogenic bacteria and fermenting the acid effluent from said first reactor vessel in said second reactor vessel under anaerobic conditions at a pH in a range of between about 5 and 6 and a temperature in a range of between about 115 to 160 degrees Fahrenheit to produce the process effluent and gas.

5. The process as in claim 1 wherein:
   a. said steps of introducing the waste water into said first reaction zone and fermenting the waste water therein comprises passing the waste water through a first set of sequentially aligned reactor vessels containing thermophilic, fixed growth, acidogenic bacteria and fermenting the waste water in said first set of sequentially aligned reactor vessels under anaerobic conditions at a pH in a range of between about 5 and 6 and a temperature in a range of between about 115 to 160 degrees Fahrenheit to produce the acid effluent; and
   b. said steps of conveying the acid effluent to said second reaction zone and fermenting the waste water therein comprises passing the acid effluent through a second set of reactor vessels containing thermophilic, fixed growth, acidogenic bacteria and fermenting the acid effluent in said second set of reactor vessels under anaerobic conditions at a pH in a range of between about 5 and 6 and a temperature in a range of between about 115 to 160 degrees Fahrenheit to produce the process effluent.

6. The process as in claim 1 further comprising:
   a. providing structure for supporting fixed growth bacteria in said first reaction zone comprising at least one inclined plate; and
   b. providing structure for supporting fixed growth bacteria in said second reaction zone comprising at least one inclined plate.

7. The process as in claim 1 further comprising:
   a. providing structure for supporting fixed growth bacteria in said first reaction zone comprising a plurality of sheets of corrugated material having troughs and peaks and secured within said first reaction zone such that said troughs and peaks are angled upward; and
   b. providing structure for supporting fixed growth bacteria in said second reaction zone comprising a plurality of sheets of corrugated material having troughs and peaks and secured within said second reaction zone such that said troughs and peaks are angled upward.

8. A method of anaerobic treatment of waste water comprising the steps of:
   a. introducing waste water containing organic material into a first reactor vessel containing thermophilic, fixed growth, acidogenic bacteria;
   b. fermenting the waste water in said first reactor vessel under anaerobic conditions at a pH in a range between about 5 and 6 and a temperature in a range between about 115 to 160 degrees Fahrenheit to produce a first effluent;
   c. conveying the first acid effluent to a second reactor vessel containing thermophilic, fixed growth, acidogenic bacteria;
   d. thereafter fermenting the first effluent in said second reactor vessel under anaerobic conditions at a pH in a range between about 5 and 6 and a temperature in a range between about 115 to 160 degrees Fahrenheit to produce a second effluent;
   e. conveying the second effluent to a third reactor vessel containing thermophilic, fixed growth, methanogenic bacteria;
   f. fermenting the second effluent in said third reactor vessel under anaerobic conditions at a pH in a range between about 7.2 and 8.2 and a temperature in a range between about 115 to 160 degrees Fahrenheit to produce a third effluent and gas including methane;
   g. collecting at least a portion of the gas including methane produced through the fermentation of the second effluent in the third reactor vessel;
   h. conveying the third effluent to a fourth reactor vessel containing thermophilic, fixed growth, methanogenic bacteria;
   i. fermenting the third effluent in said fourth reactor vessel under anaerobic conditions at a pH in a range between about 7.2 and 8.2 and at a temperature in a range between about 115 to 160 degrees Fahrenheit to produce a fourth effluent and gas including methane;
   j. collecting at least a portion of the gas including methane produced through the fermentation of the third effluent in said fourth reactor vessel; and
   k. removing the fourth effluent.

9. The process as in claim 8 wherein:
   a. said step of fermenting the waste water in said first reactor vessel comprises fermenting the waste water in said first reactor vessel at a temperature in a range between about 133 to 143 degrees Fahrenheit;
   b. said step of fermenting the first effluent in said second reactor vessel comprises fermenting the first effluent in said second reactor vessel at a temperature in a range between about 133 to 143 degrees Fahrenheit;
   c. said step of fermenting the second effluent in said third reactor vessel comprises fermenting the second effluent in said third reactor vessel at a temperature in a range between about 133 to 143 degrees Fahrenheit; and
   d. said step of fermenting the third effluent in said fourth reactor vessel comprises fermenting the third effluent in said fourth reactor vessel at a temperature in a range between about 133 to 143 degrees Fahrenheit.

10. The process as in claim 8 wherein:
    a. said step of fermenting the waste water in said first reactor vessel comprises fermenting the waste water in said first reactor vessel at a temperature of about 138 degrees Fahrenheit;
    b. said step of fermenting the first effluent in said second reactor vessel comprises fermenting the first effluent in said second reactor vessel at a temperature of about 138 degrees Fahrenheit;
    c. said step of fermenting the second effluent in said third reactor vessel comprises fermenting the second effluent in said third reactor vessel at a temperature of about 138 degrees Fahrenheit; and
    d. said step of fermenting the third effluent in said fourth reactor vessel comprises fermenting the third effluent in said fourth reactor vessel at a temperature of about 138 degrees Fahrenheit.

11. The process as in claim 8 further comprising:
    a. providing structure for supporting fixed growth bacteria in said first, second, third and fourth reactor vessels comprising at least one inclined plate secured within each of said first, second, third and fourth reactor vessels.

12. The process as in claim 8 further comprising:
    a. providing structure for supporting fixed growth bacteria in said first, second, third and fourth reactor vessels comprising at least one sheet of corrugated material having troughs and peaks and secured within each of said first, second, third and fourth reactor vessels such that said troughs and peaks are angled upward.

* * * * *